(No Model.)

J. L. KINGSTON.
EXTENSION CURTAIN ROD.

No. 565,546. Patented Aug. 11, 1896.

Witnesses.
Edward G. Allen.
Thomas S. Drummond

Inventor.
James L. Kingston,
by Crosby & Gregory
Attys.

UNITED STATES PATENT OFFICE.

JAMES L. KINGSTON, OF BOSTON, MASSACHUSETTS.

EXTENSION CURTAIN-ROD.

SPECIFICATION forming part of Letters Patent No. 565,546, dated August 11, 1896.

Application filed February 14, 1895. Serial No. 538,332. (No model.)

*To all whom it may concern:*

Be it known that I, JAMES L. KINGSTON, of Boston, county of Suffolk, State of Massachusetts, have invented an Improvement in Extension Curtain-Rods, of which the following description, in connection with the accompanying drawings, is a specification, like letters on the drawings representing like parts.

My invention relates to extension curtain-rods, and has for its object the production of a simple rod having a wide range of adjustment to adapt it for use in connection with window-frames of greatly varying width.

One part of my invention consists in an extension curtain-rod comprising a plurality of smooth-surfaced unperforated members, one telescoping another, and means inclosed in said members to adjust the same longitudinally to vary the length of the rod, substantially as will be described.

Another part of my invention consists in molding an india-rubber tip directly upon and enveloping the end of the rod or holder for the rod end.

Other features of my invention will be hereinafter fully described, and particularly pointed out in the claims.

Reference is to be had to the accompanying drawings, forming a part of this specification, in which similar letters of reference indicate corresponding parts in all figures.

Figure 1:
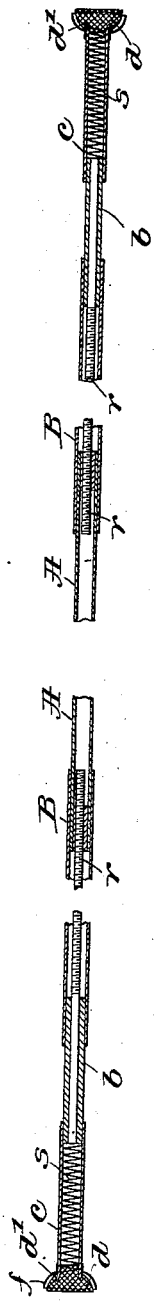
Figure 2:
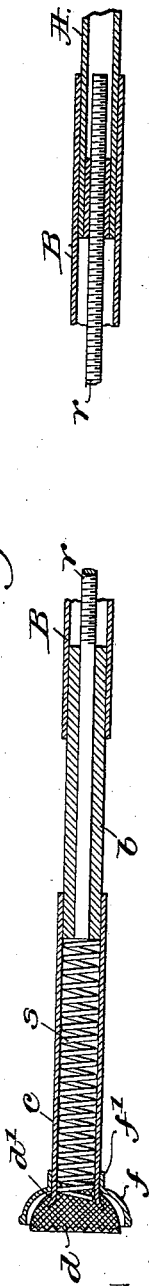

Figure 1, in longitudinal section, shows one form of an extension curtain-rod embodying my invention, the same being broken out at intervals to shorten it for the drawing. Fig. 2 shows the left-hand portion of Fig. 1 on an enlarged scale, and Fig. 3 a view showing a modification of my invention.

The adjustable curtain-rod shown in the drawings and constituting one embodiment of my invention comprises three telescoping members, viz., the middle member A, and the tubular end members B B, which receive the ends of the middle member. To adjust the telescoping members for varying the length of the rod, I have herein provided the threaded rods $r\ r$, rigidly held at their outer sides by and in the plugs $b\ b$, and closing the outer ends of the members B B, said threaded rods extending inside the said members B B for nearly or quite their entire lengths, as shown. The middle member A is shown as provided with plugged ends, perforated and threaded to receive the threaded rods $r\ r$ referred to. (See Figs. 1 and 2.) Rotation of either of the members A B relatively to the other will cause the threaded rod $r$ to move the member A longitudinally within the member B to vary the length of the rod.

The end plugs $b\ b$ are herein shown as extended beyond the ends of their members B B, to enter suitable end holders $c\ c$, shown as tubular or socket-like in form and having molded and vulcanized directly upon their outer ends suitably-shaped rubber tips $d\ d$, the ends of the sockets within said tips being preferably flanged, as shown at $d'$, to furnish a better hold upon the tips.

Springs $s$ are shown in the sockets $c$, interposed between the plugs $b$ and tips $d$, and preferably molded and vulcanized to the material of said tips, as shown, thereby greatly simplifying the construction over any heretofore known to me.

For use the extension-rod is placed between the two holding-faces, usually the faces of the window-casing, and the middle member A rotated relatively to the end members B B until the said members shall have been telescopically lengthened sufficient to press the rubber tips $d\ d$ firmly against the holding surfaces, the telescopic extension being preferably continued until the springs $s\ s$ are fully compressed, in order that they, by their resiliency, may serve to afterward keep the rod firmly held in clamped position notwithstanding any changes in the distance between the holding-surfaces due to expansion and contraction and the like.

In some cases the spring at one end of the rod will alone be sufficient to hold the rod in place, and for narrow windows the number of telescoping members may be lessened or for wider windows increased.

Figure 3:
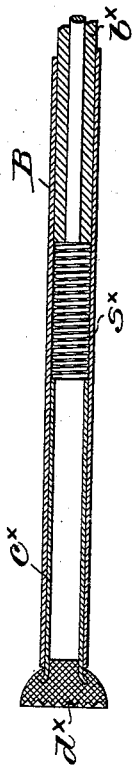

In Fig. 3 I have shown the holder $c^\times$ as made small enough in diameter to enter the prolonged end of the tubular member B, the end of the latter reaching nearly or quite to the tip $d^\times$, the spring $s^\times$ in such construction, if used, being interposed between the end of the socket-tubes and the plug $b^\times$, as shown.

In some cases it is desirable to conceal the rubber tips $d$, and for this purpose I provide the cup-shaped shields $f$, provided with suitable necks $f'$, adapted to be slipped upon the holder or the end of the member B, as the case may be, and, if need be, soldered or otherwise secured in position, concealing the outer side of the tip, as shown in Fig. 2. Such a shield also acts to prevent excessive compression of the tips, which, if permitted, might cut or otherwise injure the same.

I claim—

1. An extension curtain-rod comprising a plurality of telescoping members formed of thin tubing; a threaded rod secured to and within the outer one of said members, by means of a plug provided therefor in and to fill the outer end of said outer member, a second plug provided within the inner of said telescoping members to receive said rod in threaded engagement therewith, whereby said members are relatively and positively adjustable longitudinally; suitable end sockets, and a spring interposed between one of said sockets and said members to hold the positively-adjusted rod always in position, substantially as described.

2. An extension curtain-rod comprising a plurality of telescoping members formed of thin tubing; a threaded rod secured to and within the outer one of said members by means of a plug provided therefor in and to fill the outer end of said outer member a second plug provided within the inner of said telescoping members to receive said rod in threaded engagement whereby said members are relatively and positively adjustable longitudinally; a tubular end socket adapted to receive telescopically the extended free end of said end plug to form a rod of uniformly smooth exterior, substantially as described.

3. An extension curtain-rod, comprising a plurality of telescoping members formed of thin tubing; a threaded rod secured to and within the outer one of said members by means of a plug provided therefor in and to fill the outer end of said outer member; a second plug provided within the inner of said telescoping members to receive said rod in threaded engagement, whereby said members are relatively and positively adjustable longitudinally; a tubular end socket adapted to receive telescopically the extended free end of said end plug to form a rod of uniformly smooth exterior, said end socket being provided with a rubber tip fixedly secured thereto and partially inclosed within a cup-shaped holder, substantially as described.

In testimony whereof I have signed my name to this specification in the presence of two subscribing witnesses.

JAMES L. KINGSTON.

Witnesses:
JOHN C. EDWARDS,
AUGUSTA E. DEAN.